(12) United States Patent
Zwayer (10) Patent No.: US 12,350,764 B2
(45) Date of Patent: Jul. 8, 2025

(54) METHODS AND APPARATUS FOR HYBRID-DIESEL ENGINE BLOCK HEATER

(71) Applicant: Illinois Tool Works Inc., Glenview, IL (US)

(72) Inventor: Jake Zwayer, Appleton, WI (US)

(73) Assignee: Illinois Tool Works Inc.

(*) Notice: Subject to any disclaimer, the term of this patent is extended or adjusted under 35 U.S.C. 154(b) by 229 days.

(21) Appl. No.: 16/567,090

(22) Filed: Sep. 11, 2019

(65) Prior Publication Data

US 2020/0101553 A1   Apr. 2, 2020

Related U.S. Application Data

(60) Provisional application No. 62/738,166, filed on Sep. 28, 2018.

(51) Int. Cl.
*B23K 9/10* (2006.01)
*H05B 1/02* (2006.01)

(52) U.S. Cl.
CPC ......... *B23K 9/1006* (2013.01); *H05B 1/0236* (2013.01)

(58) Field of Classification Search
CPC ...... B23K 9/1006; B23K 9/32; B23K 9/1043; H05B 1/0236; H05B 1/0227; Y02T 10/40; F02N 11/0818; F02N 11/0811; F02N 2200/023; F02M 31/125
See application file for complete search history.

(56) References Cited

U.S. PATENT DOCUMENTS

| 6,083,369 | A  | * | 7/2000 | Tanigawa | G01N 27/4067 204/424 |
| 2005/0264257 | A1 | * | 12/2005 | Inui | B60L 58/24 320/104 |
| 2009/0107743 | A1 | * | 4/2009 | Alston | B60H 1/00428 903/906 |
| 2009/0272353 | A1 | * | 11/2009 | Gates | F02N 19/04 123/142.5 R |
| 2010/0300083 | A1 | * | 12/2010 | Uemoto | F01N 9/002 60/311 |
| 2011/0114607 | A1 | * | 5/2011 | Albrecht | B23K 9/1012 219/108 |

(Continued)

OTHER PUBLICATIONS

Piston Definition & Meaning_Dictionary.com (Year: 2016).*
Canadian Office Action Appln No. 3,112,024 dated Feb. 28, 2024.

*Primary Examiner* — Tiffany T Tran
(74) *Attorney, Agent, or Firm* — MCANDREWS HELD & MALLOY LTD.

(57) ABSTRACT

Apparatus and methods are provided for a welding-type power system that includes an engine configured to drive an electric generator to provide a first power output. An energy storage device to provide a second power output. A controller is configured to receive one or more control signals to provide a total power output to at least one of a welding-type output or an auxiliary type output, determine proportional values for the first power output and the second power output that add up to the total power output based on a power demand signal that indicates a contribution of the first power output and the second power output, control the engine to adjust speed based on the first power output value, and control a connection from the energy storage device to provide the second power output to the welding-type output based on the second power output value.

17 Claims, 3 Drawing Sheets

(56) References Cited

U.S. PATENT DOCUMENTS

| | | | | |
|---|---|---|---|---|
| 2012/0324868 A1* | 12/2012 | Kim | ................... | B60W 10/30 |
| | | | | 60/274 |
| 2013/0327752 A1* | 12/2013 | Salsich | ................... | B23K 9/09 |
| | | | | 219/137.71 |
| 2014/0216268 A1* | 8/2014 | Burch | ................... | F24C 15/18 |
| | | | | 99/352 |
| 2014/0263245 A1* | 9/2014 | Ulrich | ................ | B23K 9/1081 |
| | | | | 219/133 |
| 2014/0303874 A1* | 10/2014 | Sasaki | ................... | F02N 19/04 |
| | | | | 701/104 |
| 2015/0096523 A1* | 4/2015 | Schenkel | ................ | F02F 1/28 |
| | | | | 123/193.3 |
| 2015/0167600 A1* | 6/2015 | Kawamura | ............ | F02M 53/06 |
| | | | | 123/445 |
| 2015/0198133 A1* | 7/2015 | Ballard | ................... | F01P 11/20 |
| | | | | 392/465 |
| 2015/0367439 A1* | 12/2015 | Enyedy | ............... | B23K 9/1006 |
| | | | | 219/133 |
| 2016/0057811 A1* | 2/2016 | Alarcon | ................. | A24F 40/50 |
| | | | | 219/494 |
| 2016/0103189 A1* | 4/2016 | DeMarco | ............... | G01R 31/40 |
| | | | | 324/764.01 |
| 2016/0230644 A1* | 8/2016 | Dudar | ..................... | F01P 11/16 |
| 2016/0265469 A1* | 9/2016 | Harada | ............... | F02M 51/061 |
| 2016/0332520 A1* | 11/2016 | Miller | ..................... | B60L 7/18 |
| 2017/0298890 A1* | 10/2017 | King | .................. | F02N 11/0818 |
| 2017/0326670 A1* | 11/2017 | Enyedy | ............... | F02N 11/0862 |
| 2018/0079023 A1* | 3/2018 | Enyedy | ................ | B23K 9/1006 |
| 2018/0106231 A1* | 4/2018 | Aiello | .................... | F02N 19/04 |
| 2018/0141508 A1* | 5/2018 | Lee | ..................... | B60R 16/0232 |
| 2018/0264581 A1* | 9/2018 | Schraff | .................. | B23K 9/205 |
| 2018/0283333 A1* | 10/2018 | Richardson | ........... | B01J 29/7007 |

\* cited by examiner

METHODS AND APPARATUS FOR HYBRID-DIESEL ENGINE BLOCK HEATER

CROSS REFERENCE TO RELATED APPLICATIONS

This application is a Non-Provisional Patent Application claiming priority to U.S. Provisional Patent Application No. 62/738,166, entitled "Methods and Apparatus for Hybrid-Diesel Engine Block Heater" filed Sep. 28, 2018, which is herein incorporated by reference in its entirety.

BACKGROUND

Conventional welding-type power supplies provide power for welding-type tools. Some such power supplies are coupled to a fossil fuel-powered engine that drives an electric generator. In some cases, engine performance can be degraded if subjected to cold temperatures. Conventional solutions include plugging a heater into a utility power source to raise the temperature of the engine. A system that can is capable of mitigating damage to cold temperatures without relying on utility power, would provide various advantages for welding-type power supplies.

SUMMARY

Apparatus and methods are disclosed of an engine driven welding-type power system that includes an engine to drive an electric generator to provide a first power output, and an energy storage device to provide a second power output, for example, a hybrid welder. In particular, the system employs an energy storage device to provide a first power output to power a heating element to heat the engine to mitigate effects from low temperatures, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Disclosed are examples of an engine driven welding-type power system that includes an engine to drive an electric generator to provide a first power output, and an energy storage device to provide a second power output (e.g., a hybrid welder). In particular, the system employs an energy storage device to provide a first power output to power a heating element to heat the engine to mitigate effects from low temperatures. For example, a temperature of the engine, and engine block, and/or an environmental temperature can be monitored, and a controller can connect the energy storage device to power the heating element if a temperature falls below a predetermined threshold level. In some examples, a timer can provide a control signal to the controller to provide power to the heating element from the energy storage device. Additionally or alternatively, a user input can provide control signals to control provision of the heating element.

In disclosed examples, a welding-type power system includes an engine that includes an engine block, an energy storage device, and a controller. The controller is configured to generate a control signal based on one of a temperature of the engine block or a timer, and control the energy storage device to provide a power output to a heating element in thermal communication with the engine block based on the control signal.

In examples, the controller is further configured to monitor an energy level of the energy storage device. In some examples, the controller is further configured to end provision of the power output to the heating element in response to the energy level falling below a first threshold energy level, the temperature exceeding a temperature threshold, or in response to expiration of the timer. In examples, the controller is further configured to control the engine to activate in response to the energy level falling below the first threshold energy level. In examples, the controller is further configured to control the engine to deactivate in response to the energy storage value exceeding a second threshold energy level. In some examples, the controller is further configured to control the energy storage device to end provision of power in response to the engine activating.

In disclosed examples, an auxiliary power supply is included, with the controller configured to control the auxiliary power supply to provide an auxiliary power output to one or more of the heater element or the energy storage device.

In examples, a user interface configured to send information to and receive information from the controller, wherein the information comprises instructions to adjust one or more of a duration of a timer expiration, one or more threshold energy levels, one or more temperature threshold values, or a heater element start time.

In some examples, the heating element is one or more of a resistive heating element or an inductive heating device. The energy storage device comprises one or more of a lead acid battery, a nickel cadmium battery, a lithium ion battery, a capacitor, a supercapacitor, a fuel cell or any combination thereof. In examples, one or more sensors are configured to monitor the temperature of the engine block or an environmental temperature.

In examples, the controller controls the energy storage device to provide power to the heating element in response to the environmental temperature falling below a first threshold temperature or the environmental temperature falling below a second threshold temperature.

In disclosed examples, a welding-type power system includes an engine configured to drive an electric generator to provide a first power output, an energy storage device to provide a second power output, at least one of a timer or a sensor to monitor a temperature of the engine and a controller. The controller is configured to receive one of the temperature from the sensor or a control signal from the timer, and control the energy storage device to provide the second power output to a heating element in thermal communication with the engine block based on the temperature or the control signal.

In some examples, the controller configured to monitor an energy level of the energy storage device, compare the energy level to one or more threshold energy levels, and control the engine to provide the first power output to the energy storage device in response to the energy level falling below a first threshold energy level. In examples, the controller is configured to control the engine to deactivate in response to the energy level exceeding a second threshold energy level. In examples, the engine, the electric generator, the energy storage device and the controller are located within a housing.

In examples, the controller is further configured to generate an alert in response to the temperature falling below a first threshold temperature value, and in response to the energy level falling below the first threshold energy level. In examples, the engine is a diesel powered engine.

In disclosed examples, the energy storage device is a first energy storage device, the system further comprising a second energy storage device, wherein the controller is configured to control power output from the first and second energy storage devices to the heater element based on the temperature and an energy storage level of a respective energy storage device. In some examples, the first and second energy storage devices comprise one or more of a lead acid battery, a nickel cadmium battery, a lithium ion battery, a capacitor, a supercapacitor, a fuel cell, or any combination thereof.

As disclosed herein, an engine driven welder employs an engine (e.g., a diesel-powered engine, a 25-horsepower output, etc.). An energy storage device, such as a lead-acid type or other rechargeable battery, can be added to the system, which can be configured to supplement or replace a power output of the engine (e.g., an electric generator driven by the engine). In examples, power output from the engine may be supplemented with power from the energy storage device, such as to generate an increased total output, and/or when fuel for the engine is not readily available.

Hybrid welding systems provide expanded functionality in comparison to conventional welding systems, often at a lower cost. For example, in some situations, providing a high power output level (e.g., to support an arc gouging process) is used infrequently, such that including an engine suitable to output such a high power level would result in a system having a capacity rating that is rarely used, while including the resources to make such an engine operable (e.g., a high capacity engine, generator, etc.). Thus, a hybrid system is disclosed, employing both an engine driven generator and/or an energy storage device to output power for a load.

When the system is off, such as when the particular job site is closed and no welding operations are being performed, the system and engine may be subjected to environmental conditions at the job site. For instance, the job site may be out of doors, and in colder climes, the engine may be subjected to freezing temperatures, which can have a negative effect on engine performance. Diesel engines, for instance, operate with the aid of multiple fluids, such as lubricants and fuel. In freezing temperatures, the flow of the fluids may slow, and/or the fluid may solidify, causing a blockage and/or damaging the engine. To mitigate the damage from freezing temperatures, heat may be applied to the engine.

In conventional applications, a heater is plugged into a utility power to heat the engine. However, this requires that the engine is near utility power. On many job sites, that would require moving the engine from the job site to a structure with utility power. Further, the heater would be plugged in for extended periods of time, and/or require an operator to monitor the system during heating operations.

By contrast, the disclosed system is configured to employ the energy storage device(s) to provide power to a heating element which heats the engine to prevent the engine falling below a threshold temperature level. Therefore, the system can remain on the job site, utilizing the energy storage incorporated in the hybrid system. The system is configured to selectively activate the heating element, such as by use of one or more sensors, user interfaces, networked information, algorithms, and/or other mechanisms to heat the engine yet limit unnecessary power draw.

Some example user controls and/or algorithms provide nearly infinite adjustability, which can be optimized by the system "learning" different operational trends (e.g., via artificial intelligence, machine learning techniques, etc.), such as by identification of locations, environments, and/or projects where the heating element is often activated, as well as preferences of a particular user and/or demands on the system. Such algorithms can be informed by a plurality of sensors, stored and/or networked information, which can be analyzed for trends to control operation of the heating element, and/or to build operational profiles based on historical data for reference during future operations.

In some examples, a controller can automatically regulate output from the energy storage device based on a variety of factors. For example, the energy level or capacity of the energy storage device may depend on a variety of factors, including a number of discharge cycles performed, depth of each and/or an average discharge event, operating temperatures, manufacturing date, and in-service date, to name but a few. The factors can include the particular operation to be performed (e.g., measured temperature(s), length of time the operation is to be performed, etc.), data from sensors associated with one or both of the engine and/or the energy storage device, and historical data compiled by the system during use, and/or historical data compiled by other hybrid systems. Based on the data, algorithms run by the controller can manage heating, recharge, and discharge of the energy storage device, to protect the system from cold temperatures while limiting depleted storage capacity. Accordingly, a welding-type system with an improved tool to mitigate the impact of cold temperatures is disclosed.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "torch" or "welding-type tool" can include a hand-held or robotic welding torch, gun, or other device used to create the welding arc.

As used herein, the term "engine-driven welding-type system" includes one or more of the engine, a generator, and an energy storage device.

As used herein, the term "engine block" includes a cast metal block containing one or more cylinders of an internal-combustion engine.

As used herein, the term "controller" or "control circuitry" includes digital and/or analog circuitry, discrete or integrated circuitry, microprocessors, DSPs, FPGAs, etc., and/or software, hardware and firmware, located on one or more boards, used to control all or part of a welding-type system or a device such as a power supply, power source, engine or generator.

As used herein, a "circuit" or "circuitry" includes any analog and/or digital components, power and/or control elements, such as a microprocessor, digital signal processor (DSP), software, and the like, discrete and/or integrated components, or portions and/or combinations thereof.

As used herein, the term "energy storage device" is any device that stores energy, such as, for example, a battery, a supercapacitor, etc.

As used herein, the term "memory" includes volatile and non-volatile memory, and can be arrays, databases, lists, etc.

As used herein, the term "welding mode" or "welding operation" is the type of process or output used, such as CC, CV, pulse, MIG, TIG, spray, short circuit, etc.

As used herein, the term "boost converter" is a converter used in a circuit that boosts a voltage. For example, a boost converter can be a type of step-up converter, such as a DC-to-DC power converter that steps up voltage while stepping down current from its input (e.g., from the energy storage device) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

Figure 1:
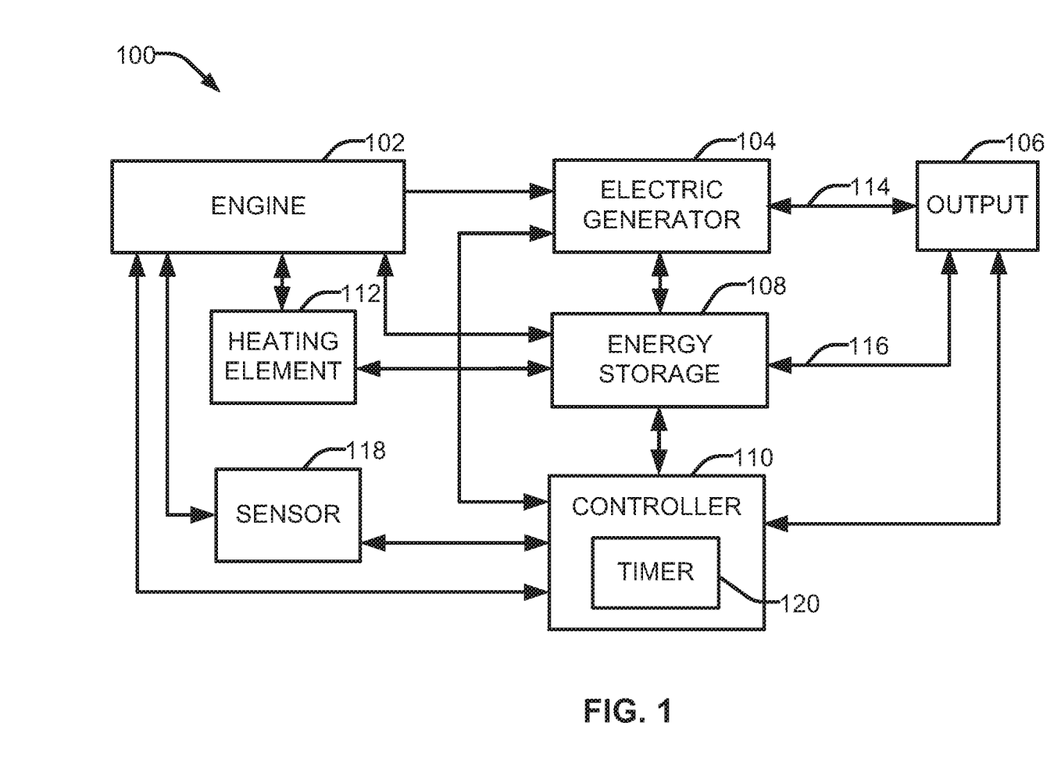
FIG. 1 is a block diagram of an example welding-type power system in accordance with aspects of this disclosure.

FIG. 1 is a block diagram of an example welding-type power system 100. The example power system 100 includes an engine 102 connected to an electric generator 104 to feed an output 106 (e.g., a power receptacle, welding output, etc.). An energy storage device 108 is connected to one or more of the engine 102, the electric generator 104, the output 106, and a heating element 112. A controller 110 is connected to one or more of the engine 102, the generator 104, the output 106, the energy storage device 108, and one or more sensors 118 to monitor the temperature of the engine block and/or an environmental temperature.

In some examples, the engine 102, via the generator 104, can generate a first power output 114 to the output 106, whereas the energy storage device 108 provides a second power output 116. In some examples, the first and second power outputs 114 and 116 can be combined into a total power output to power a high capacity load. The first and second power outputs 114, 116 are therefore typically available to power a load at output 106, such as to perform a welding-type operation. However, when the engine 102 is not in operation, and in response to low temperatures at the engine 102 and/or in the environment, the second power output 116 from the energy storage device 108 can be employed to heat the engine 102 via the heating element 112.

As described above, low temperatures can have a negative effect on engine performance. A common reason is engines operate with the aid of multiple fluids, such as lubricants and fuel. In freezing temperatures, the flow of the fluids may slow, and/or the fluid may solidify, causing a blockage and/or damaging the engine 102. Heating the engine 102 ensures the engine 102 is in a condition to operate (e.g., the fluids are in a liquid form) when the engine 102 is activated. As disclosed herein, the system 100 is configured to power the heating element 112 with output from the energy storage device 108. In some examples, the heating element 112 is powered by one or more energy sources, such as mains power, an energy collection device (e.g., solar paneling), a mechanical source (e.g., a generator turned via one or more motors), or other suitable source.

In an example, the controller 110 is configured to monitor a temperature measurement from the sensor 118 and determine if the temperature has fallen below a predetermined threshold temperature. For example, the controller 110 can compare the measured temperature to a list of temperature threshold values, such as a low temperature below which engine performance may be compromised. The threshold values may be stored in memory based on one or more specifications (e.g., manufacturer's operation guidelines, fluid freezing guidelines, etc.), and/or in response to a user input. If the controller 110 determines that the temperature has fallen below a certain threshold level (e.g., freezing temperatures), the controller 110 generates a control signal to control the energy storage device 108 to provide a power output to the heating element 112. The power output activates the heating element 112 (e.g., a resistive heating element, an inductive heating element, a glow plug, etc.), that is in thermal communication with the engine block, to heat the engine 102.

The sensor 118 can provide the controller 110 with a temperature of the engine 102 itself, and/or an environmental temperature. Thus, the controller 110 controls the energy storage device 108 to provide power to the heating element 112 in response to the environmental temperature falling below the first threshold temperature, and/or a second threshold temperature specific to the environment.

In this manner, the system 100 is used to mitigate the effects of low temperatures on fluids and other temperature sensitive components within and/or near the engine 102 that would otherwise compromise engine and/or system performance. Further, a timer 120 can be included with controller 110 and/or be connected to the controller 110 (e.g., communicating via wired and/or wireless communications channels). The timer 120 can be configured to cause the energy storage device 108 to provide power to the heating element 112 based on a desired time value, such as starting at a particular time (e.g., two hours before a work shift starts), providing power for a desired duration of time, as well as ending provision of power at a particular end time. A user interface can be connected to the timer 120 and/or the controller 110 to adjust one or more time values. If the measured temperature exceeds a temperature threshold (i.e. above freezing, etc.), or upon expiration of the timer 120, the controller 110 can end provision of the power output from the energy storage device 108.

The controller 110 is further configured to monitor an energy level of the energy storage device 108. For instance, the energy storage device 108 can be one or more of a lead acid battery, a nickel cadmium battery, a lithium ion battery, a capacitor, a supercapacitor, a fuel cell or any combination thereof. During use, either to provide power to output 106 and/or to power the heating element 112, the energy storage device 108 loses charge. When the stored energy level drops below a predetermined threshold energy level, the energy storage device 108 may be unable to perform one or more operations.

To ensure the energy storage device 108 is sufficiently charged, the controller 110 is configured to compare the energy level to a plurality of energy threshold values (i.e. stored or otherwise set within the system 100). For instance, the controller 110 is configured to end provision of the power output to the heating element 112 in response to the energy level falling below a threshold energy level. One or more threshold levels may reflect a level of energy storage below which the energy storage device would provide degraded performance, damage the energy storage device 108, and/or a user defined setting.

In an example, the controller 110 is configured to control the engine 102 to activate in response to the energy level falling below the first threshold energy level. A connection, such as via converter 236 shown in FIG. 2, can condition the power output from the electric generator 104 to recharge the energy storage device 108. During a recharge operation, the controller 110 continues to monitor the energy level, and controls the engine 102 to deactivate in response to the energy storage value exceeding a second threshold energy level. In some examples, the engine 102 may be controlled on a schedule and/or in accordance with a user input, for instance, to prevent automatic start-up of the engine 102 without an operator on site. Further, the controller 110 ends provision of power to the energy storage device 108 in response to the engine 102 activating.

Additionally or alternatively, the controller 110 is configured to generate an alert in response to the temperature falling below a first threshold temperature value, and/or in response to the energy level falling below the first threshold energy level.

In some examples, the system 100 is configured to generate a combined power output comprising both first and second power outputs 114, 116. Thus, the system 100 may operate as a hybrid welding system to generate a power output greater than a rated output of either the engine 102/electric generator 104 or the energy storage device 108. In an example, the output 106 is configured for a particular type of connection (e.g., a welding-type torch cable), while in other examples the output 106 can be modified to accept multiple types of connectors. In the example of FIG. 1, the output 106 may be configured with multiple connection outputs, and/or one or more adapters to accommodate various loads (e.g., a welding-type torch, a rechargeable battery, 120-volt power cord, etc.).

The welding-type power system 100 can provide power to various loads via output 106, such as welding-type power to a welding-type torch (e.g., MIG, TIG, GMAW, FCAW, plasma cutter, etc.), power to an auxiliary device (e.g., a preheating device, a wire feeder, a grinder, lighting, etc.), as well as provide battery level power to charge a battery. In some examples, the load type may be identified by a feedback signal associated with the output 106. Thus, the feedback signal can inform the controller 110 as to what load is present, identify a corresponding mode of operation, etc. For example, when the load is a welding-type torch, the controller 110 can determine a type of load (e.g., associated with a welding mode of operation) associated with an expected measured power draw. Additionally or alternatively, a rechargeable battery or auxiliary type tool can be connected to the output 106, such that the controller 110 determines the type of load and mode of operation (e.g., a battery charging mode, a 120-volt output, etc.).

Figure 2:
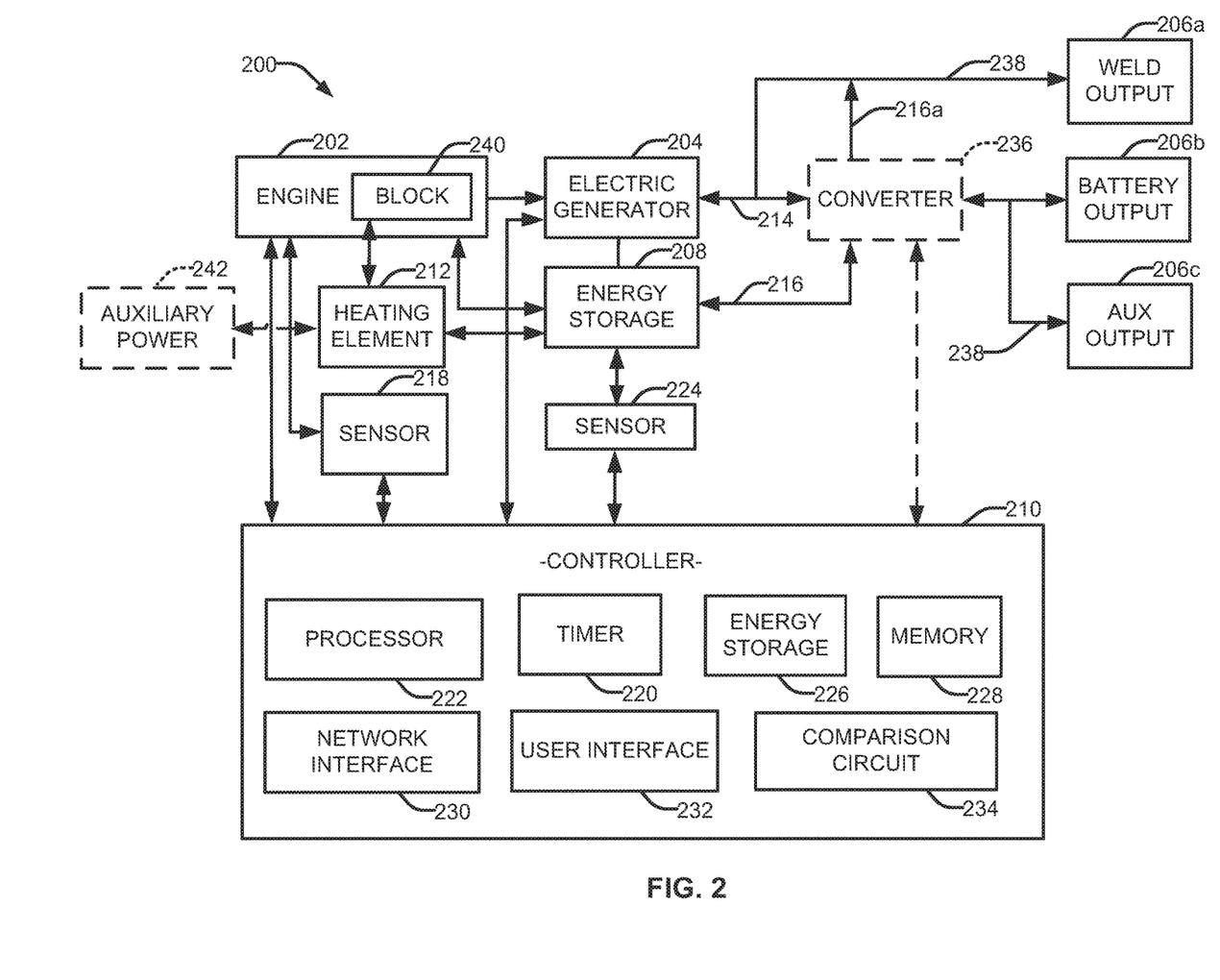
FIG. 2 illustrates a block diagram of another example welding-type power system in accordance with aspects of this disclosure.

FIG. 2 is a block diagram of an example welding-type power system 200. System 200 can be configured to operate with one or all of the features disclosed with respect to system 100, as provided herein. The example power system 200 includes an engine 202 having an engine block 240 and connected to an electric generator 204 to provide a power output 214 sufficient to power a welding-type tool, directed to a welding output 206a, a battery charging output 206b, and/or an auxiliary power output 206c. In some examples, a converter 236 can be used to convert power for the battery charging output 206b and/or the auxiliary power output 206c (e.g., to power auxiliary power components, such as a wire feeder, compressed air system, etc.). In some examples, the converter 236 can be a buck converter, a boost converter and/or a bi-directional converter.

An energy storage device 208 provides a second power output 216, being connected to one or more of the engine 202, the electric generator 204, the outputs 206a-206c, and a heating element 212. A controller 210 is connected to one or more of the engine 202, generator 204, outputs 206a-206c, the energy storage device 208, and one or more sensors 218 to monitor the temperature of the engine block and/or an environmental temperature. In some examples, the system 200 includes a housing configured to enclose all or a portion of one or more of the engine 202, the electric generator 204, the energy storage device 208, the heating element 212, and the controller 210.

While the first and second power outputs 214, 216 are generally available to power a load at outputs 206a-206c, particularly when the engine 202 is not in operation, the second power output 216 from the energy storage device 208 can be employed to heat the engine 202 via the heating element 212 in response to a trigger (e.g., low temperatures at the engine 202 or in the environment, a timer, etc.). A trigger could also be a circuit, switch, or other hardware mechanism that could automatically respond to lower temperatures, cooperating with the controller 210 or without the aid of the controller 210 altogether. In some examples, the first power output 214 and the second power output 116 can combine to create a total power output 238 to power a high capacity load.

The controller 210 is configured to monitor and control when and how the energy storage device 208 is to be used to power the heating element 212. The controller 210 can be configured as a microcontroller, or to include a processor 222, to perform as a programmable logic circuit (e.g., comparison circuit 234), a system-on-chip, a programmable logic device, and/or any other type of logic circuit. In some examples, the controller 210 can include a memory storage device 228, an energy storage device 226, a timer 220, a network interface 230, and/or a user interface 232. For example, the user interface 232 (e.g., a switch, a computer input device, etc.) provides options for an operator to control a function of the power sources and/or outputs at the system 200, such as providing instructions to adjust one or more of a duration of a timer expiration, one or more threshold energy levels, one or more temperature threshold values, or a heater element start time.

The controller 210 can be implemented in hardware and/or software, and can be configured to receive information from the sensor 218 (i.e. temperature), regarding characteristics of the energy storage device 208 from sensor 224 (i.e. charge level), for example. The information can also correspond to other sensor data, a user input, as well as data related to trend analysis, threshold values, profiles associated with a particular operation, etc., and can be stored in a comparison chart, list, library, etc. The information may be stored in and/or accessed from the memory 228, and/or may be from a remote networked system accessible via the network interface 230.

In an example, the controller 210 monitors an engine temperature and/or an environmental temperature measurement from the sensor 218 and determines if the temperature has fallen below a predetermined threshold temperature, similar to the example system 100 of FIG. 1. For example, the comparison circuit 234 can compare the measured temperatures to a list of temperature threshold values stored in memory 228, accessed via the network interface, and/or in response to an input from the user interface 232. If the controller 210 determines that the temperature has fallen below a certain threshold level (e.g., freezing temperatures), the controller 210 generates a control signal to control the energy storage device 208 to provide a power output to the heating element 212 to heat the engine 202.

Additionally or alternatively, the user interface 232 can include a list of operations with either a set of known parameters, or a list of operations that correspond to a learned operation. Thus, the known and/or historical actions and conditions associated with a particular device and/or environment will aid in the determination of when to power the heating element 212, activate the engine 202, as well as when to draw power from the energy storage device 208 and at what amount.

Further, timer 220 can be configured to cause the energy storage device 208 to provide power to the heating element 212 based on a desired time value, such as starting at a particular day and/or time of day, providing power for a desired duration of time, as well as ending provision of power at a particular end time. The timer 220 can also be controlled by the user interface 232, and/or based on information provided via the memory 228, network interface 230, etc.

The controller 210 is further configured to monitor an energy level of the energy storage device 208 (similar to the energy storage device 108). Thus, the comparison circuit 234 compares the energy level to a plurality of threshold energy level, and may end provision of the power output to the heating element 212 in response to the energy level falling below a threshold energy level (e.g., below which the energy storage device would provide degraded performance, damage the energy storage device 208, and/or a user defined setting).

If the energy level falls below a first or low threshold level, the controller 210 can control the engine 202 to activate in response to provide the first power output 214, e.g. via converter 236, to condition the power output from the electric generator 204 to recharge the energy storage device 208. During such a recharge operation, the controller 210 continues to monitor the energy level, and controls the engine 202 to deactivate in response to the energy storage value exceeding a high or second threshold energy level. As disclosed herein, the engine 202 may be controlled on a schedule and/or in accordance with a user input, for instance, to prevent automatic start-up of the engine 202 without an operator on site. Further, the controller 210 ends provision of power to the energy storage device 108 in response to the engine 202 activating.

In examples, information regarding system usage trends (e.g., activation temperatures, amount of time required to raise the temperature of the engine 202 or engine block 240, length of time the energy storage device 208 can power the heating element 212 before reaching a low threshold energy level, etc.) based on the monitored signals can be analyzed and stored (e.g., in memory 228) and/or communicated via the network interface 230. These trends can be used to predict when the controller 210 should control activation of the energy storage device 208 to power the heating element 212, the engine 202 to start and/or stop, in response to one or more temperatures or characteristics, such as a prediction as to when the energy storage device 208 energy storage level will fall below the first threshold temperature level (e.g., based on a rate of discharge, a starting level of energy storage level, etc.). The usage trends can be specific to the system 100, 200, or be loaded onto the memory 228 (via interfaces 230, 232) to reflect usage trends of other systems.

In some examples, the controller 210 includes a network interface 230 configured to send and/or receive information from a remote device (e.g., a remote computer, a cloud computing environment, a smartphone, etc.). The calculations, determinations, comparisons, analysis, stored data, etc., can be performed and/or updated via network interface 230, and/or on a smartphone application.

The network interface 230 can be used to receive and transmit information, such as to control operation of the system 200 from a remote system and/or provide alerts or other information to the remote system (i.e. when a threshold temperature has been crossed; when a threshold charge level has been crossed; when the engine 202 has been activated; etc.). The information associated with operation of the system 200 can similarly be analyzed in order to build a library of parameters associated with desired heating procedures and shared via the network interface 230.

In some examples, the energy storage device 208 is a rechargeable battery pack (e.g., a lithium-ion battery, a nickel-metal hydride battery, lead-acid battery, etc.). In other examples, the energy storage device 208 is a hybrid battery module, a capacitor, a supercapacitor, or any other type of suitable storage device, or a combination of a rechargeable battery pack and a hybrid battery module. In examples, the controller 210 can perform an analysis of one or more characteristic of the energy storage device 208 based on manufacturing specifications that can affect useful life of the energy storage device 208, including the type, number and/or the quality of battery cells used.

The energy storage device 208 can also be configured as an energy storage system that includes multiple energy storage devices. In some examples, each energy storage device can be connected together (e.g., in a bank of batteries connected in series, parallel, etc.) to multiply the output of the energy storage system. In examples, the controller can control a power output from each energy storage device within the system, to selectively output power to the heater element in response to a trigger (e.g., a temperature measurement, a timer, etc.). The controller 210 may determine an energy storage level of each respective energy storage device within such a system, to provide power to the heating element 212 from an energy storage device of the energy storage system with an energy storage level above a certain threshold, and/or a relatively high energy storage level.

In some examples, one or more component may be in direct communication with another component, for example, one or more of the various system components (e.g., the controller 210) can be directly linked to any one or more of the other components (e.g., the electric generator 204, the converter 236, the sensors 224, etc.) to facilitate communication.

In any event, the controller 210 can selectively control the power provided to each output. Consistent with the disclosed examples, each of the outputs 206a, 206b, 206c can provide the same level of power (e.g., each operating in a welding mode or a battery recharging mode), or different levels of power. In this example, the output 206a can be operating in a welding mode, and output 206b can be powering a rechargeable battery. In yet another example, the output 206c provides auxiliary 115 or 220 VAC power, independent of or simultaneously during a welding operation to power, e.g., lights, a grinder, a battery charger, etc.

In some examples, system sensor(s) 224 monitor characteristics corresponding to, among other things, engine 202 operational parameters (e.g., run time, temperature, fuel consumption, etc.), energy storage device 208 parameters (e.g., charge level, number of discharge/charge events, depth of charge, time in operation, etc.) and one or more parameters associated with power demand (e.g., a voltage, current, temperature, resistance, impedance, etc.). The information is provided by the sensor(s) 224 to controller 210 and is used to control operation of the system 200.

In some examples, an auxiliary power supply 242 can be connected to the system 200 to provide an auxiliary power output to one or more of the heating element 212 to generate heat for the engine 202/engine block 240, and/or to recharge the energy storage device 208.

Figure 3:
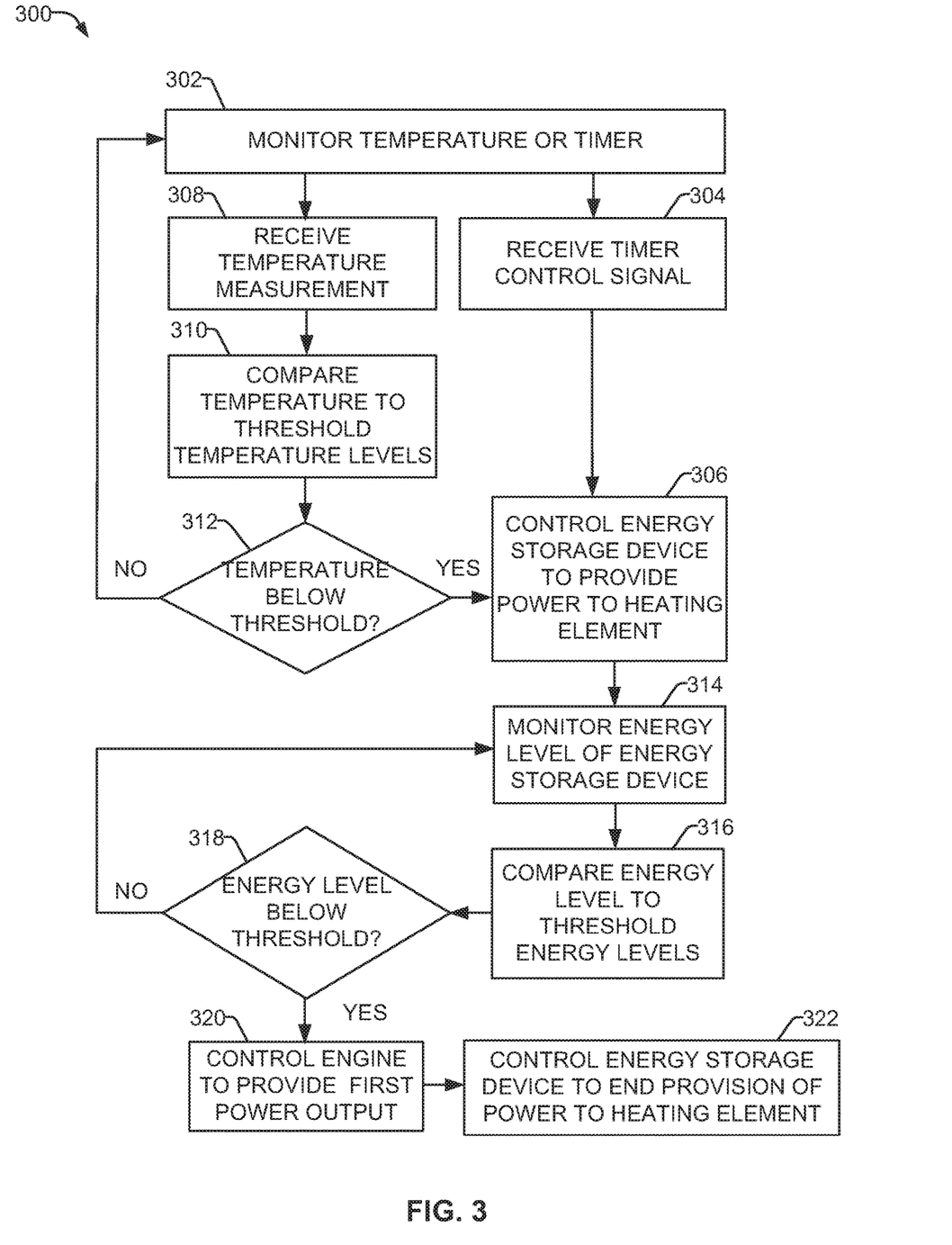
FIG. 3 illustrates an example method of operating a welding-type power system in accordance with aspects of this disclosure.

FIG. 3 is a flowchart illustrating example method 300 of operating a welding-type power system, for example, the welding-type power system 100 of FIG. 1 and the welding-type power system 200 of FIG. 2. The method 300 of FIG. 3 may be implemented by a controller (e.g., controllers 110, 210) by executing machine-readable instructions, such as stored on a non-transitory machine-readable storage device (e.g., memory 228).

At block 302 of method 300, a temperature measurement is monitored (e.g., at controller 110, 210 from sensor 118, 218) and/or a timer input (e.g., via timer 120, 220).

At block 304, the controller receives a timer control signal to provide power to at least a heating element (e.g., heating element 112, 212) from one or more energy storage devices (e.g., energy storage devices 108, 208). At block 306, the controller controls the one or more energy storage devices to provide power to heat the heating element.

Additionally or alternatively, a temperature measurement is received from a sensor (e.g., sensor 118, 218) in block 308. In block 310, the controller compares the received temperature to one or more threshold temperature levels (e.g. via comparison circuit 234). At block 312, the controller determines if the received temperature falls below a first threshold temperature level. If not, the process returns to block 302 to continue to monitor the temperature and/or timer values.

If the temperature has fallen below the first threshold temperature level, the process similarly proceeds to block 306 to provide power to the heating element to heat the engine/engine block (e.g. engine 102, 202, engine block 240). During the heating operation, the controller monitors an energy level of the one or more energy storage devices in block 314. In block 316, the energy level is compared to one or more threshold energy levels, and advances to block 318 to determine if the energy level has fallen below a first threshold energy level.

If not, the process returns to block 314 to continue to monitor the energy level throughout the duration of the heating operation. If the energy level has fallen below the first energy threshold level, the process advances to block 320, with the controller configured to control the engine to activate and provide power a power output via a connection (e.g., converter 236) to recharge the energy storage device. In response, the controller controls the energy storage device to end provision of power to the heating element in block 322.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power system, comprising:
an engine comprising an engine block, wherein the engine block includes a metal block containing one or more cylinders of the engine;
an energy storage device;
a hybrid welder configured to receive power from the engine and the energy storage device;
a heating element configured to receive power from the energy storage device;
one or more sensors configured to monitor a temperature of the engine block or an environmental temperature; and
a controller configured to:
compile historical data of the temperature of the engine block or the environmental temperature based on data from the one or more sensors over time; build operational profiles based on the historical data of the temperature of the engine block or the environmental temperature or the historical data corresponding to generation of a control signal;
generate the control signal based on the operational profiles and one of the temperature of the engine block;
control the energy storage device to provide a power output to the heating element in thermal communication with the engine block based on the control signal;
monitor an energy level of the energy storage device; and
end provision of the power output to the heating element in response to the energy level falling below a first threshold energy level, wherein the first threshold energy level is at least one of:
an energy level below which the energy storage device would provide degraded performance; or an energy level below which the energy storage device would risk damage.

2. The system of claim 1, wherein the controller is further configured to end provision of the power output to the heating element in response to the temperature exceeding a temperature threshold or in response to expiration of the timer.

3. The system of claim 2, wherein the controller is further configured to control the engine to activate in response to the energy level falling below the first threshold energy level.

4. The system of claim 3, wherein the controller is further configured to control the engine to deactivate in response to the energy level exceeding a second threshold energy level.

5. The system of claim 3, wherein the controller is further configured to control the energy storage device to end provision of power in response to the engine activating.

6. The system of claim 1, further comprising an auxiliary power supply, the controller configured to control the auxiliary power supply to provide an auxiliary power output to one or more of the heater element or the energy storage device.

7. The system of claim 1, further comprising a user interface configured to send information to the controller, wherein the information comprises instructions to adjust one or more of a duration of a timer expiration, one or more threshold energy levels, one or more temperature threshold values, or a heater element start time.

8. The system of claim 1, wherein the heating element is one or more of a resistive heating element or an inductive heating device.

9. The system of claim 1, wherein the energy storage device comprises one or more of a lead acid battery, a nickel cadmium battery, a lithium ion battery, a capacitor, a supercapacitor, a fuel cell or any combination thereof.

10. A welding-type power system, comprising:
an engine configured to generate a first power output and comprising an engine block, wherein the engine block includes a metal block containing one or more cylinders of the engine;
an energy storage device configured to generate a second power output;
a hybrid welder configured to receive the first power output from the engine and the second power output from the energy storage device;
a heating element configured to receive power from the engine and the energy storage device;
one or more first sensors configured to monitor a measured environmental temperature;
one or more second sensors configured to monitor a measured energy level of the energy storage device; and
a controller configured to:
compile first historical data of the measured environmental temperature, second historical data of an energy level of the energy storage device, and third historical data of a plurality of discharge events of the energy storage device based on data from the one or more first and second sensors over time;
build an environmental temperature operational profile based on the first historical data of the measured environmental temperature;
build an energy storage operational profile based on the second historical data of the energy level;
build an energy discharge operational profile based on the third historical data of the plurality of discharge events;
generate a control signal based on the environmental temperature operational profile and the measured environmental temperature;
control the energy storage device to provide a power output to the heating element in thermal communication with the engine block based on the control signal;
control the energy storage device to provide the power output to the heating element in response to the measured environmental temperature falling below a first threshold temperature;
determine a first threshold energy level based on the environmental temperature operational profile and the energy storage operational profile;
determine a second threshold energy level based on the environmental temperature operational profile, the energy storage operational profile, and the energy discharge operational profile;
monitor the measured energy level of the energy storage device;
control the engine to generate the first power output to recharge the energy storage device in response to the energy storage level falling below the second threshold energy level; and
end provision of the power output to the heating element in response to the energy level falling below the first threshold energy level.

11. A welding-type power system, comprising:
an engine comprising a metal engine block containing one or more cylinders of the engine and configured to drive an electric generator to provide a first power output;
an energy storage device to provide a second power output;
a heating element in thermal communication with the engine block and configured to receive the second power output from the energy storage device;
a first sensor configured to monitor a temperature of the engine;
a second sensor configured to monitor an energy level of the energy storage device; and
a controller configured to:
receive the temperature from the first sensor and the energy level from the second sensor;
compile first historical data of the temperature of the engine over time;
compile second historical data of the energy level of the energy storage device over time;
build an operational profile based on the first historical data and the second historical data;
compare the energy level to one or more threshold energy levels;
activate the engine to provide the first power output to the energy storage device in response to the energy level falling below a first threshold energy level of the one or more threshold energy levels, wherein the first threshold energy level is at least one of:
an energy level below which the energy storage device would provide degraded performance; or
an energy level below which the energy storage device would risk damage; generate a control signal based on the operational profile; and
control the energy storage device to provide the second power output to the heating element based on the control signal.

12. The system of claim 11, wherein the controller is further configured to control the engine to deactivate in response to the energy level exceeding a second threshold energy level.

13. The system of claim 11, further comprising a housing, wherein the engine, the electric generator, the energy storage device and the controller are located within the housing.

14. The system of claim 11, wherein the controller is further configured to generate an alert in response to the temperature falling below a first threshold temperature value, and in response to the energy level falling below the first threshold energy level.

15. The system of claim 11, wherein the engine is a diesel powered engine with an approximate 25-horsepower output.

16. The system of claim 11, wherein the energy storage device is a first energy storage device, the system further comprising a second energy storage device, wherein the controller is configured to control power output from the first and second energy storage devices to the heating element based on the temperature and an energy storage level of a respective energy storage device.

17. The system of claim 16, wherein the first and second energy storage devices comprise one or more of a lead acid battery, a nickel cadmium battery, a lithium ion battery, a capacitor, a supercapacitor, a fuel cell, or any combination thereof.

* * * * *